April 5, 1932. G. W. JACQUES 1,852,849
DUPLEX FASTENER SETTING MACHINE
Filed Sept. 9, 1927 5 Sheets-Sheet 1
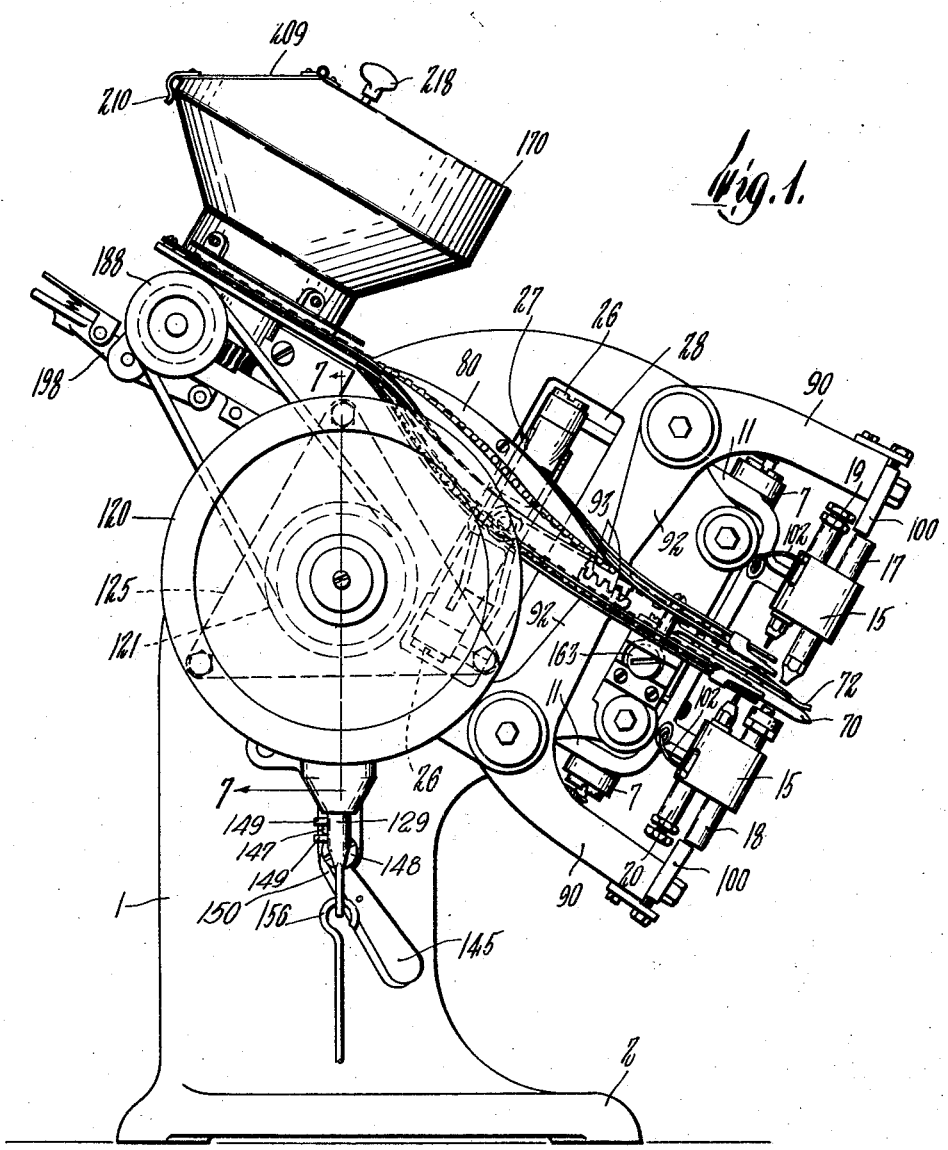

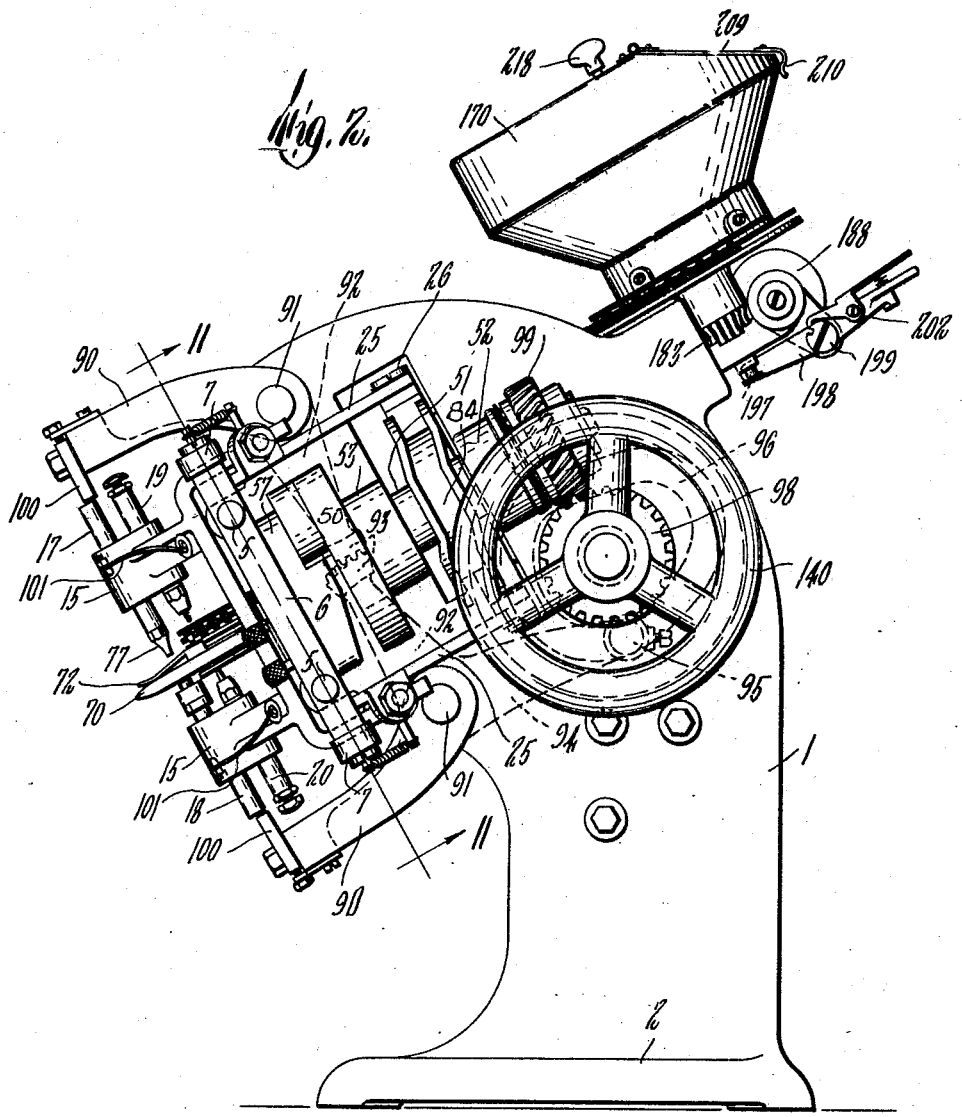

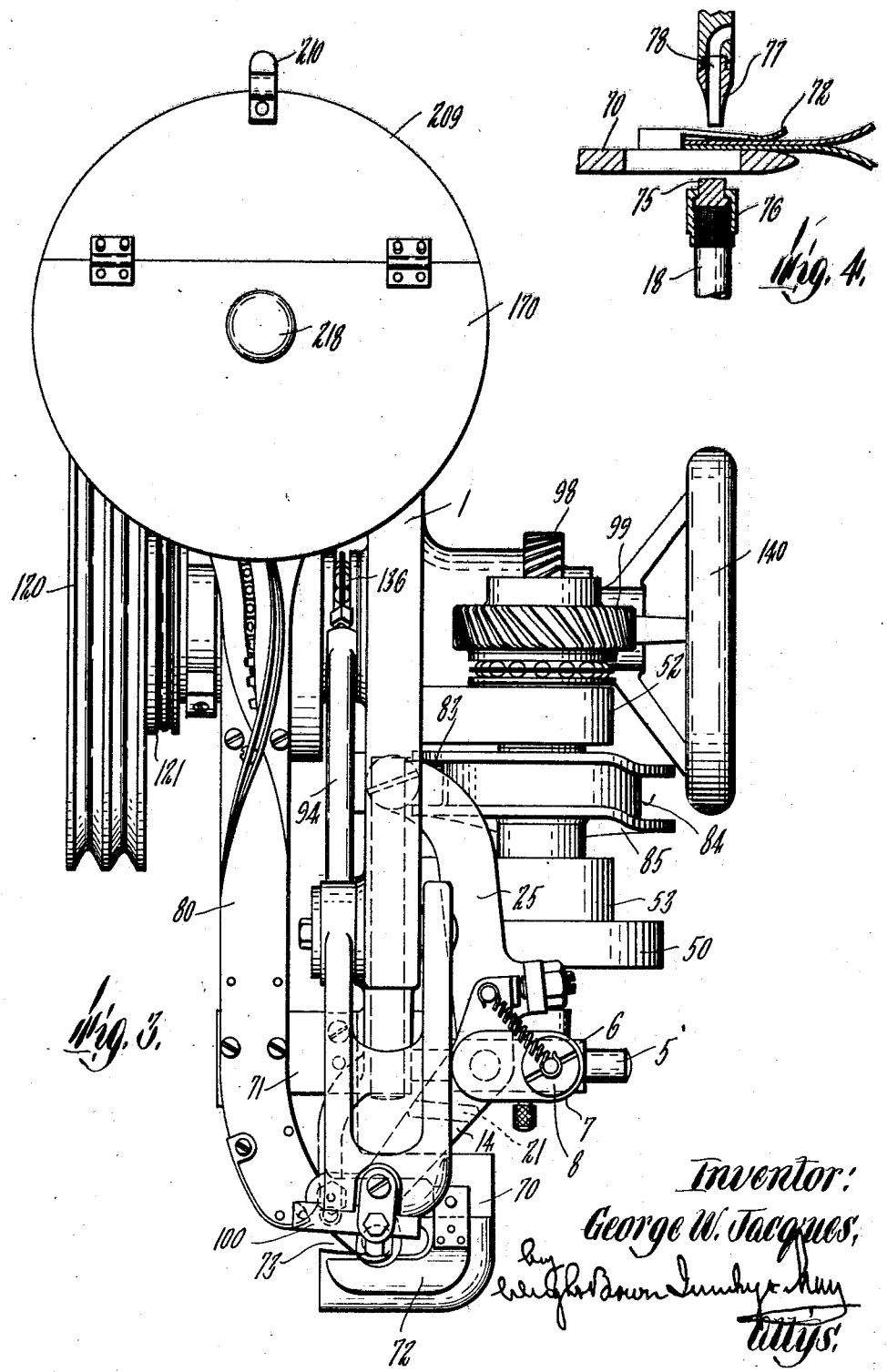

April 5, 1932. G. W. JACQUES 1,852,849
DUPLEX FASTENER SETTING MACHINE
Filed Sept. 9, 1927 5 Sheets-Sheet 4
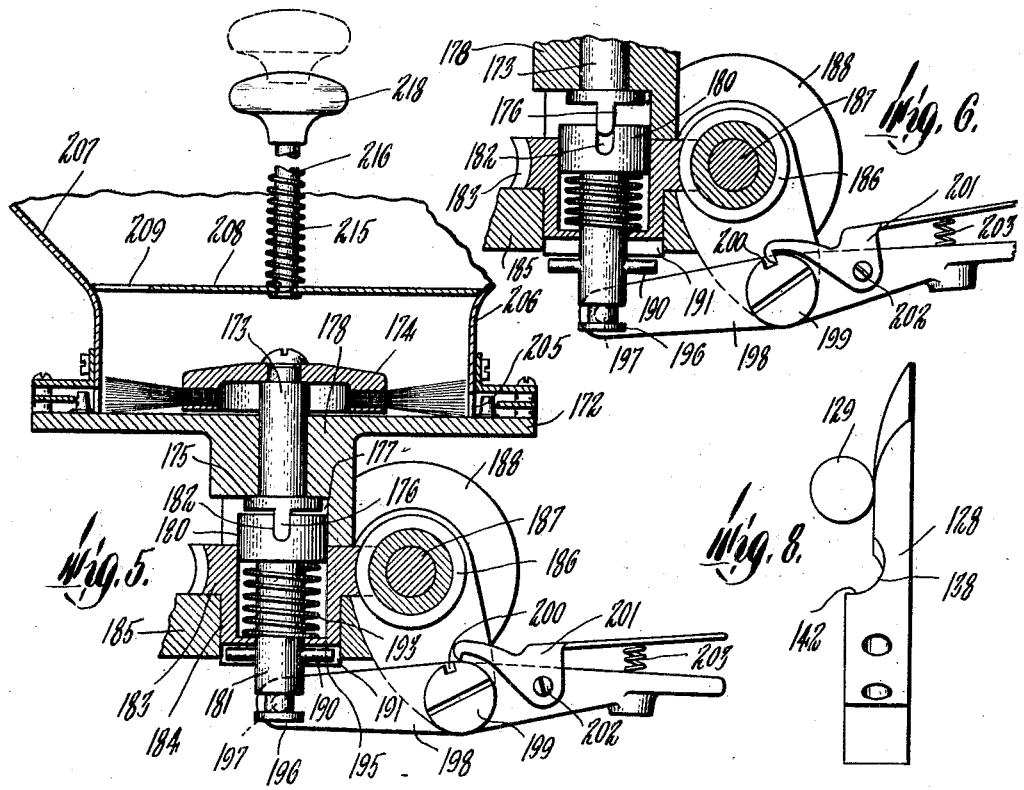
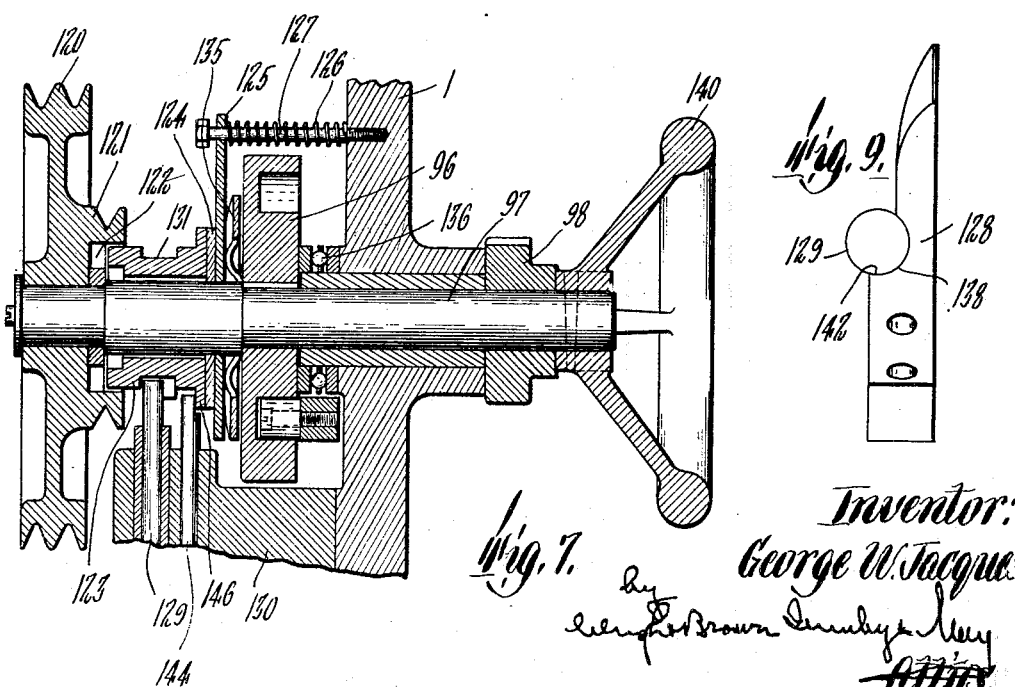
Inventor:
George W. Jacques

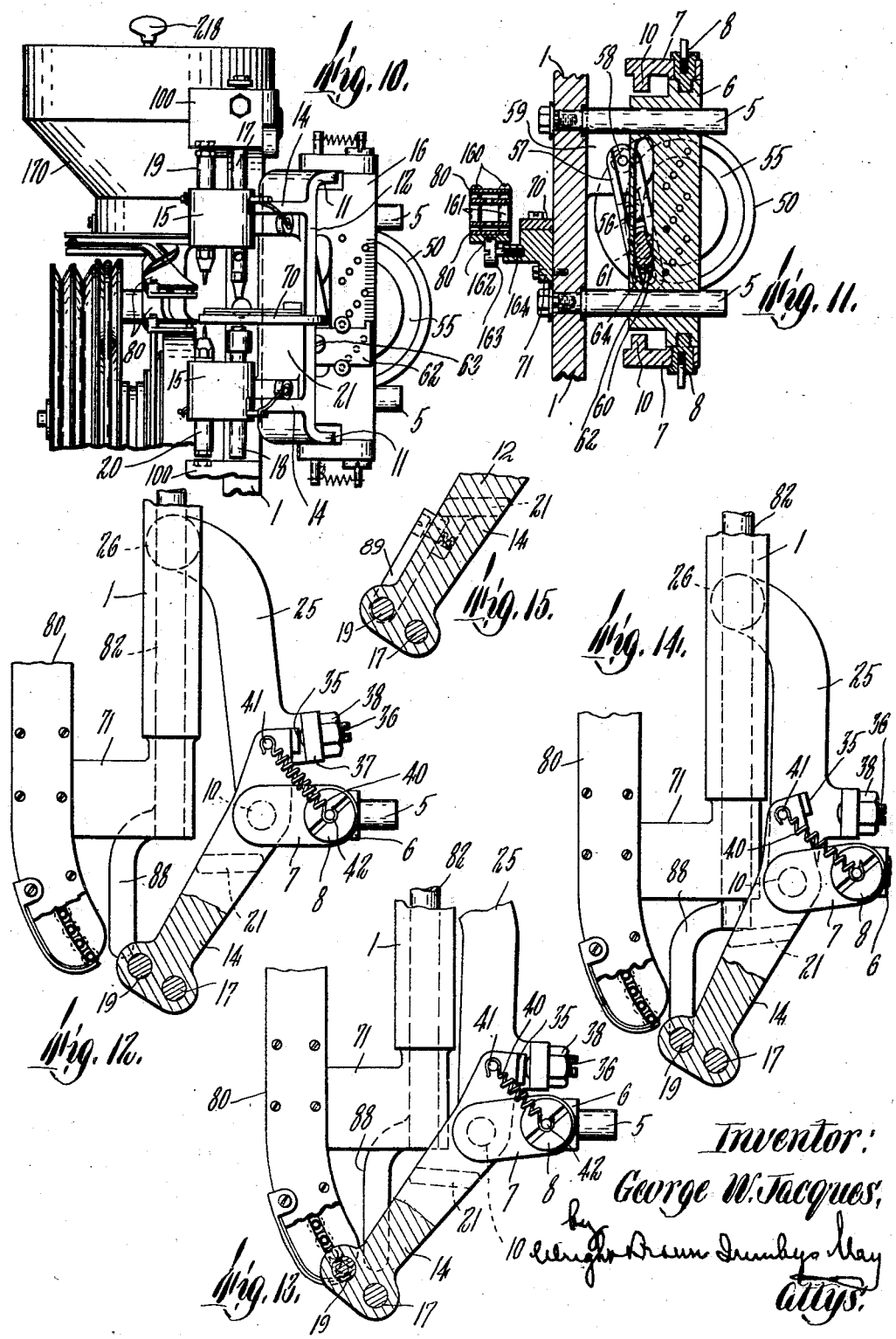

Patented Apr. 5, 1932

1,852,849

UNITED STATES PATENT OFFICE

GEORGE W. JACQUES, OF NEW BEDFORD, MASSACHUSETTS, ASSIGNOR TO ATLAS TACK CORPORATION, OF FAIRHAVEN, MASSACHUSETTS, A CORPORATION OF NEW YORK

DUPLEX FASTENER SETTING MACHINE

Application filed September 9, 1927. Serial No. 218,458.

This invention relates to fastener setting machines of the duplex type, that is, in which a pair of fasteners are set simultaneously in opposed relation in two layers of work.

One of the objects of the present invention is to simplify and lighten the machine to make possible high speed with a minimum of vibration.

A further object is to provide such a machine in which the punching and feeding of the work is effected before the fastener setting operation in each cycle, the fasteners being presented and set in the first feed position in the cycle.

A still further object is to provide a simplified punching mechanism for punching both layers of the material in which the fasteners are to be set.

Other improvements reside in the driving mechanism by which the machine is brought to rest quickly and in the desired position of its operative cycle, but so relieved from frictional drag as to permit it to be turned over by hand readily from that position.

Further objects and advantages will appear from a more complete description of a duplex eyeleting machine embodying the invention disclosed in the accompanying drawings in which Figure 1 is a left side elevation of the machine.

Figure 1a is a detail in perspective.

Figure 2 is a right side elevation of the machine.

Figure 3 is a top plan of the machine.

Figure 4 is a detail section through the punching mechanism and work support.

Figures 5 and 6 are sectional details of the supply hopper and drive mechanism, the drive parts being shown in different positions.

Figure 7 is a section on line 7—7 of Figure 1.

Figures 8 and 9 are details of the stop cam and pin in different positions.

Figure 10 is a fragmentary front elevation of the machine.

Figure 11 is a detail section on line 11—11 of Figure 2.

Figures 12, 13 and 14 are details showing the relative positions of raceways, punches and sets during successive stages of the cycle of operation.

Figure 15 is a sectional detail showing a modification.

As best shown in Figures 1, 2, and 3, the operative mechanisms are carried entirely by a single upstanding web 1 having a supporting foot 2 at its lower end by which it may be carried on a suitable bench or platform. The upper end portion of the web 1 projects forwardly and is provided, as shown best in Figure 11, with a pair of laterally extended guide pins 5 on which is rectilinearly slidably supported a feed frame 6, which as shown in Figure 2, is arranged upwardly and forwardly inclined relative to the operator. At the upper and lower ends of this feed frame, links 7 are pivoted thereto as by means of the pivot screws 8. The outer ends of the links 7 are pivoted by the integral pins 10 to end flanges 11 of a tool-supporting block or carrier indicated as a whole at 12. This block is provided with spaced arms 14 having enlarged head portions 15 at their ends through which are slidably mounted in opposed relation, the upper and lower punches 17 and 18 and the upper and lower sets 19 and 20. The arms 14 are joined by a web 21. The pivots 10 not only connect the links 7 to the arms 14, but they also pivotally connect these members with upper and lower levers 25, the rear ends of which are pivoted by the screws 26 to upper and lower bearing bosses 27 carried by the web 1 and extending within a transverse opening 28 therethrough. The pivot screws 26 form the pivotal center for the feed motion of the work, as will later appear, and the levers 25 are swung backwardly and forwardly as the feed frame 6 is reciprocated on the guide pins 5, the links 7 permitting the rectilinear motion of the feed frame to impart the desired swinging motion to the levers 25 without binding of the parts.

As will be seen from an inspection of Figures 12, 13 and 14, the tool-supporting block has a pivotal motion about the pins 10 which permits it a motion in addition to the feed motion produced by swinging of the levers 25. This pivotal motion is for the purpose of bringing the punches and sets alternately into operative relation to the work. For controlling this motion, the arms 14 are extended rearwardly of the pivot 10 and are provided with wear pieces 35 which are normally pressed into engagement with the ends of adjusting wear screws 36 extended through flanges 37 in the sides of the arms 25, the screws 36 being held in adjusted position as by means of the lock nuts 38. Such pressing together of these parts is effected by means of the springs 40 reacting between pins 41 on the arms 14 and pins 42 positioned centrally in the pivot pins 8. When the stops are in contact, the punches are in operative position. But at suitable times, as will later appear, the tool block is swung about the pivots 10 to bring the sets into operative position.

The feed frame 6 is given its traversing motion by means of a cam 50 positioned on the forward end of a cam shaft 51 which is journaled in bosses 52 and 53 projecting from one side of the web 1, the shaft 51 being arranged in a forwardly and downwardly inclined position. The cam 50 is provided with a face cam groove 55 within which rides a follower 56 on a lever 57, this lever being pivoted at 58 to a portion 59 projecting laterally from the web 1, as shown in Figure 11. The lever 57 is provided with a longitudinal slot within which rides a block 60 carried by a pin 61 journaled in and projecting inwardly from an adjustment slide 62 (see Figure 10), this slide having an integral portion projecting through a slot 64 in the feed frame. The pin 61 is held to the slide 62 by a screw 63 (Figure 10). By adjustment of the block 62 lengthwise of the feed frame, the distance of the block 60 from the fulcrum of the lever may be adjusted thus to change the effective throw of this lever to actuate the feed frame.

Both layers of work in which the fasteners are to be set are placed upon the work support 70, which is fixed to a bracket 71 extending laterally from the supporting web 1, a spring presser foot 72 carried by the work support holding the work in place thereon. As shown best in Figures 3 and 4, this work support and presser foot are each provided with a slot or clearance space 73 within which the punch mechanism may operate during the punching and feeding movements. As shown in Figure 4, the lower punch 18 is provided at its upper end with a removable anvil 75 fixed by a threaded retaining collar 76 to the shank portion of the punch, which for the punching operation is moved upwardly into the clearance space 73 at the same time that a hollow cutting punch 77 carried by the upper punching device descends and cuts through the work against the anvil 75. An opening 78 through the cutting punch 77 and opening laterally through the side of its supporting shank portion permits the escape of the punchings. Through the action of the cam 50 the punches are then moved laterally to feed the work, and to bring the setting devices in line with the last eyelet in the raceway 80, as shown in Figure 13. The sets are shown as of usual form each being provided with a central spindle which may engage within the eyelet barrel to remove it from the raceway and present it to the hole in the work.

The sets having been moved toward each other to take the eyelets from the raceway, means are provided for rocking the punch and set carrier, so that the eyelets are presented to the holes punched in the work, whereupon the sets are actuated to set the eyelets therein. This movement of the punch and set carrier to present the eyelets to the work is effected by means of a rod 82 slidable through the web member 1 and having at its rear end a cam follower 83 engaging in an edge cam groove 84 in a cam 85 also carried by the shaft 51. The outer end of the rod 82, when this rod is pushed outwardly by the action of the cam 85, impinges on the web 21 of the block 12, thus rocking this block about the pivot 10 against the tension of the springs 40. As shown also, the outer end of the rod 82 carries an anvil plate 88 adapted to be interposed between the setting devices so that the eyelets are clinched thereagainst. The rod 82 is then drawn backward, the levers 25 swung back to starting position, the position of the feed block 62 determining how far back of the final setting position this starting position is situated, thus determining the spacing between the eyelets. Instead of carrying the anvil plate by the rod 82, it may be carried by the tool block 12 being so shown in 89 in Figure 15.

The punches and sets are reciprocated toward and from each other and both relative to the work support to effect the punching and setting actions, their motions toward each other being produced by the rocking of a pair of hammers 90 pivoted at 91 to the web 1 and having connected to the opposite ends of their pivots, arms 92 provided with intermeshing gear segments 93 at their adjacent ends, whereby motion of one hammer causes opposite simultaneous motion of the other. One of the arms 92, herein shown as the lower arm, has a rearward extension 94 provided with a cam follower 95 which rides in a groove in a cam 96 keyed to the main drive shaft 97 of the machine. The shaft 51 is driven from this main shaft through a pair of spiral gears 98 and 99 on these respective shafts.

Each of the hammers 90 has an adjustable head portion 100 which bears on the punches and actuates them for their punching stroke, these heads also engaging on the outer ends of the sets for the setting strokes when the punch and set carrier block has been rocked to bring the sets in line with the holes punched in the work. The punches and sets are retracted by springs 101 and 102, respectively when the hammers permit such retraction. When the punches are in line with the heads the sets are out of line, and when the sets are in line the punches are out of line, so that only one of the two pairs of devices is axially moved at any one time.

It will be noted that the layers of work are punched together by punching means common to both while they rest in superposed relation and in contact on the upper face of a work support and that thereafter an individual fastener is set in each of the two layers of work in the holes so punched by a setting device individual for each of the two layers and an anvil placed between the layers and with opposite faces of which the two setting devices cooperate.

Driving and stop mechanism

The drive shaft 97 is shown as driven by a belt pulley 120 journaled thereon (see Figure 7) which is provided in a hub portion 121 with a clutch face 122 which cooperates with a mating clutch face on a clutch collar 123 slidable on the shaft 97 into and out of clutching relation with the pulley clutch face. The opposite end of the clutch collar 123 from the pulley, when moved out of clutching relation to the pulley, bears through a pad 124 of frictional material against a plate 125. This plate is slidably guided on bolts 127 which hold it against rotation, coil springs 126 surrounding these bolts pressing the plate away from the web 1 and toward the bolt heads and tending to hold the collar 123 in clutching engagement with the pulley 120. This clutch collar, however, has a cam face member shown detached in Figures 8 and 9 at 128 with which cooperates the upper end of a rod 129 vertically slidable through a bracket 130 carried by the web member 1. When the rod 129 is moved upwardly to bring its inner end into the groove 131 of the clutch collar at a suitable angular position, the cam member 128 rides thereagainst as shown in Figure 8, this acting to move the clutch collar out of clutching position, as shown in Figure 7, and bringing the clutch collar into braking relation to the plate 125, thus tending to stop rotation of this collar and likewise rotation of the shaft 97 with which it is keyed. At the same time, the plate 125 which has fixed thereto a brake disk 135 is moved over toward the web member 1 so as to bring this brake disk 135 against the outer face of the cam 96, thus effecting a braking action between the cam 96 and the plate 125, as well as between the clutch collar 131 and this plate. The axial thrust of these members is taken up by the thrust ball bearing shown at 136.

Just before the stopping of the shaft 97, however, the depression 138 in the cam member 128 comes opposite to the rod 129 as shown in Figure 9, thus permitting the plate 125 to spring back slightly under the action of the springs 126, but not sufficient to bring the clutch collar 131 into clutching relation with the pulley. This motion is sufficient, however, to relieve the pressure of the brake disk 135 on the cam 96, thus to reduce the braking effort on the shaft 97 so that it may be turned by hand as by means of the hand wheel 140 after the machine has been stopped. This depression 138 also performs the function of tending to prevent rebound when the rotation of the clutch collar is finally positively stopped by impingement of the shoulder 142 on the cam member 128 against the rod 129.

In order that the shaft 97 may be turned by hand, it is necessary that the rod 129 should be retracted from the cam 128, but in order that this may be done without causing springs 126 to move the clutch collar into clutching position with the pulley 102, a locking rod 144 is provided which may be projected upwardly by any suitable means, as by a rocking hand lever 145, in front of a flange 146 on the inner end of the clutch collar, thus to prevent the clutch collar from being returned by the springs 126 when the rod 129 is retracted. As shown (see Figures 1 and 1a) a pin 147 is eccentrically disposed to the pivotal axis 148 of the lever 145 and engages between spaced pins 149 carried by the rod 144. The rod 144 may be held in the desired position by engagement of a spring pressed locking dog 150 carried by the lever 145 in either of a pair of notches as 151 in the edge of a fixed disk 152. The rod 129, as shown in Figure 1, may have a hooked rod 156 attached thereto by which it may be depressed, if desired, as by means of a foot treadle (not shown).

Fastener feed mechanism

The raceways 80, hereinbefore referred to, and from the lower ends of which the eyelets are picked off by the sets, are held at their lower ends in parallel spaced relation, as shown in Figure 11, as by screws 160 and spacing collars 161. They may be adjusted as a unit toward and from the web member 1, for this purpose the lower raceway has a slot 162 therein engaging over the head 163 of an adjusting screw 164 threaded into the bracket block 71 fixed to the web member 1, to which block is also fixed the rear end of the work support.

Above its lower end the upper raceway is given a half twist as shown in Figures 1 and 3, so as to reverse the position of the eyelets therein as they are taken from the hopper, the upper raceway presenting the eyelets to its setting mechanism with the flange upwardly disposed and the lower raceway presenting its eyelets to the lower setting mechanisms with the flange lowermost. The upper ends of the raceways pass about opposite sides of the supply hopper 170 to which they are made fast, the supply hopper and the raceways forming together a unit mechanism which may be removed and replaced upon the machine as a whole.

The hopper device has a base comprising a disk shaped plate 172 through which is journalled a shaft 173 carrying at its upper end a circular agitating brush holder 174. The lower end of this shaft 173 is provided with a head 175 with a rib 176 diametrically arranged thereon. This head 175 is seated within a socket portion 177 at the lower end of a hub portion 178 of the disk 172, this socket being so formed as to partially surround and be held rearwardly by its engagement with the head 180 of a driving shaft 181, this hub having a notch 182 within which the rib 176 fits. This shaft 181 extends through a worm gear 183 having a hub 184 journaled in a bracket member 185 carried by the web 1, and it is arranged to be rotated by means of a worm 186 on a worm shaft 187 journaled in this bracket and provided at one end with a belt pulley 188 by which it may be driven by a belt passing over one of the two belt grooves in the main drive pulley 120. The worm wheel 183 is arranged to be clutched to the shaft 181 to drive the latter, and thus transmit rotation to the brush holder 174, by means of a clutch mechanism comprising a transverse pin 190 passing through the shaft 181 and, when in driving relation, resting in a notch 191 in the lower face of the hub 184 of the worm wheel. It may, however, be moved out of this notch by axial movement imparted to the shaft 181. It will be normally held therein, however, by a coil spring 193 surrounding the shaft 181 and bearing between its head 180 and wall portion 195 at the end of the worm wheel hub, the spring thus being seated in a socket in the worm wheel.

For the purpose of withdrawing the pin 190 from engagement in the slot 191, the lower end of the shaft 181 is grooved as at 196 and riding in this groove are spaced alined pins 197 projecting from the end of the lever 198 which is journaled on a screw 199 fixed to a portion of the bracket 185. The head of the screw 199 may be provided with a notch 200 within which may be engaged a dog 201 pivoted at 202 to the lever 198, this dog being pressed by the spring 203 to engage in this notch whenever the lever 198 is rocked to the proper position. When in this position, to which it may be moved manually, the dog engages in the notch and holds the lever against turning with the pin 190 out of clutching relation, thus disconnecting the rotary drive for the brushes. This disconnection, however, is accomplished independently of the disconnection afforded through the engagement between the rib 176 and the notch 182, it being possible at any time to raise up the hopper and the raceways fixed thereto and remove them from the machine since they merely rest by gravity in position thereon.

The hopper 170 is provided with openings 205 on opposite sides of the cylindrical lower wall portion 206 to permit the escape of eyelets therefrom in proper position into the raceways. Above the lower portion the hopper walls are shown as flared outwardly at 207 to form a larger upper chamber or receptacle from which the eyelets may pass in a somewhat restricted manner to the lower portion of agitator chamber past a partition plate 208 which has an arcuate slot 209 therein through which the eyelets pass. This plate bridges the small diameter lower portion of the hopper and serves to hold back the large mass of eyelets in the upper large portion of the hopper to keep their weight away from the brushes which might prevent the brushes properly agitating and turning the eyelets so as to present them in proper position to escape to the raceways.

At the upper portion of the hopper is shown a cover 209 having a spring latch 210 thereon, which cover may be opened whenever it is desired to replenish the hopper with eyelets. The plate 208 also may be moved to facilitate the removal of eyelets from the lower chamber as when a change of eyelets is desired, it being shown as held in position adjacent to the lower end of the flaring portion of the hopper by means of a spring 215 surrounding a central stem 216, the spring reacting between the plate 208 and the upper wall of the hopper and having at its upper end a head 218 projecting above the hopper which may be grasped and raised when it is desired to lift the plate 208 from its seated position.

While this invention has been shown embodied in a machine for setting eyelets, it should be understood that except as specifically stated in the appended claims, it is not limited to the setting of eyelets or other fasteners of the barrel type, that is, which have tubular shank portions which pass through the work, and it should also be evident that various changes and modifications might be made therein without departing from the spirit or scope of this invention as defined by the appended claims.

I claim:

1. In a machine for setting barrel fasteners, punching and setting devices, a stationary raceway, means for moving said devices to punch and then feed the work, and means for then actuating said devices to take a barrel fastener from said raceway and set it in the hole punched.

2. In a machine of the class described, a punch, a set, a carrrier for said punch and set, means to actuate said punch and set to punch the work and then set fasteners in the work, and means acting between the punch and set actuations to move said carrier first to feed the work and then to bring said set with a fastener thereon into alinement with the punched hole.

3. In a machine of the class described, a punch, a set, a carrier for said punch and set, means for moving said carrier while the punch is in operative position to feed the work, and means for thereafter moving said carrier to bring said set into operative position.

4. In a machine of the class described, a punch, a set, a carrier for said punch and set, a feed member pivotally supporting said carrier, means for moving said feed member to move said carrier to feed the work, and means for swinging said carrier relative to said feed member to bring the punch and set alternately into operative position.

5. In a machine of the class described, a punch, a set, a carrier for said punch and set, a feed lever to which said carrier is pivoted, means for swinging said lever to effect feed of the work, and means for swinging said carrier about its pivot on said lever to bring said punch and set alternately into operative position.

6. In a machine of the class described, a punch, a set, a carrier for said punch and set, a pair of feed levers between which said carrier is pivoted, means for swinging said levers to effect feed of the work, and means for swinging said carrier about its pivot on said levers to bring said punch and set alternately into operative position.

7. In a machine for setting barrel fasteners, punching and setting devices, a stationary fastener presenting raceway, a work support, and means to actuate said devices to cause said punch to cut a hole in the work, then to move said devices laterally to feed the work over said support, then to take a barrel fastener from said stationary raceway and set it in the hole cut in the work, and then to return said devices to initial positions.

8. In a machine of the class described, oppositely disposed punching devices and oppositely disposed setting devices, a pair of raceways for presenting a pair of fasteners simultaneously, a work support, and means to actuate such devices to cut holes simultaneously in a pair of layers of work on said support, then to move laterally to feed the work over said support while in engagement with said punching devices, then to take a pair of fasteners from said raceways, and then to set both of said fasteners simultaneously each in the hole of one of said layers of work.

9. In a machine of the class described, a frame, a slide movable rectilinearly on said frame, a tool carrier pivotally connected to said frame, operative connections between said slide and carrier, and means for moving said slide to effect work feeding and retracting movement of said tool carrier.

10. In a machine of the class described, a frame, a slide movable rectilinearly on said frame, a tool carrier, a lever pivoted to said frame and connected to said carrier, operative connections between said slide and carrier, and means for moving said slide to effect work feeding and retracting movement of said tool carrier.

11. In a machine of the class described, a frame, a slide movable rectilinearly on said frame, a tool carrier, a pair of levers each pivoted at one end to said frame and connected to said carrier at their other ends, operative connections between said slide and carrier, and means for effecting work feeding and retracting movement of said tool carrier.

12. In a machine of the class described, a frame, a slide movable rectilinearly on said frame, a tool carrier pivotally connected to said frame and to said slide, and means for moving said slide to effect work feeding and retracting movement of said tool carrier.

13. In a machine of the class described, a frame, a slide movable rectilinearly on said frame, a tool carrier, a lever pivoted to said frame and connected to said carrier, pivoted link connections between said slide and carrier, and means for moving said slide to effect work feeding and retracting movement of said tool carrier.

14. In a machine of the class described, a frame, a slide movable rectilinearly on said frame, a tool carrier, a pair of levers each pivoted at one end to said frame and connected to said carrier at their other ends, links pivoted at opposite ends to said slide and carrier, and means for moving said slide to effect work feeding and retracting movement of said tool carrier.

15. In a machine of the class described, a slide, a lever, a block carried by said slide and engaging said lever and adjustable toward and from its fulcrum by movement relative to said slide, a pivotally mounted tool carrier, operative connections between said slide and carrier, and means for swinging said lever to effect movements of said carrier of amplitude determined by the position of said block relative to said slide.

16. In a machine of the class described, a punch and a set, a carrier for said punch and set, a feed member pivotally supporting said carrier, cooperating stops on said member and carrier, a spring for holding said stops in contact with said punch in operative position, means for moving said feed member to feed work, and means acting at a suitable time in the cycle of operations to swing said carrier relative to said member to bring said stops out of contact and to present said set in operative position.

17. In a machine of the class described, devices comprising a punch and a set, a carrier for said devices, a feed member pivotally supporting said carrier, cooperating stops on said member and carrier, a spring for holding said stops in contact and with one of said devices in operative position, means for moving said feed member to feed work, and means acting at a suitable time in the cycle of operations to swing said carrier relative to said member to bring said stops out of contact and to present the other of said devices in operative position.

18. In a machine of the class described, a punch and a set, a carrier for said punch and set, a feed member pivotally supporting said carrier, cooperating stops on said member and carrier, a spring for holding said stops in contact with said punch in operative position, means for moving said feed member to feed work, an anvil, and means acting at a suitable time in the cycle of operations to swing said carrier relative to said member to bring said stops out of contact to present said set in operative position, and to present said anvil into cooperative relation to said set.

19. In a duplex machine of the class described, a work support having a slot therein, a presser foot for holding a pair of layers of work on said support, a pair of cooperating punching members movable toward and from each other and both relative to said work support at a certain portion of said slot to punch the work and movable lengthwise of said slot to feed the work, and means for setting a fastener in the holes made by the punching means in each of said pair of layers of work.

20. In a duplex machine of the class described, a support for two layers of work, a pair of cooperating punching members one above and the other below the work-supporting face of said support, said punching members being movable toward each other and both relative to said work support to punch both layers of work resting on said support, and means for setting a fastener in the holes made by the punching means in each of said two layers of work.

21. In a duplex machine of the class described, a support for two layers of work, a pair of cooperating punching members one above and the other below the work-supporting face of said support, said punching members being movable toward each other and both relative to said work support to punch both layers of work resting on said support, one of said punching members comprising a cutting element and the other of said members comprising an anvil, and means for setting a fastener in the holes made by the punching means in each of said two layers of work.

In testimony whereof I have affixed my signature.

GEORGE W. JACQUES.